Feb. 28, 1967    T. J. A. DAVIS    3,306,103
ERROR COMPENSATION FOR MEASURING GAUGES
Filed July 7, 1964    2 Sheets-Sheet 1
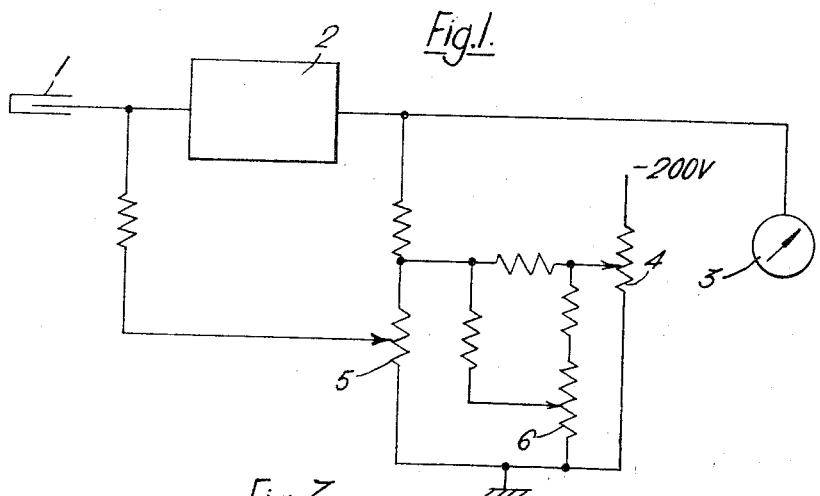
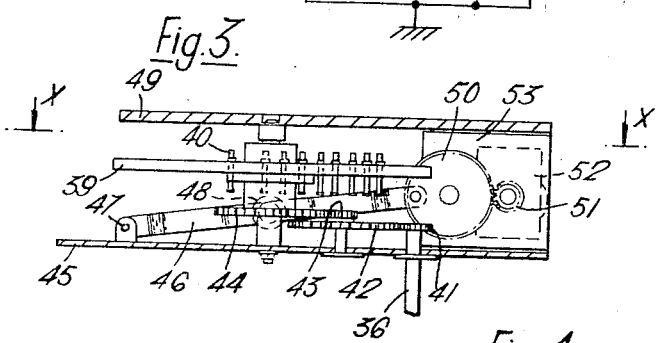
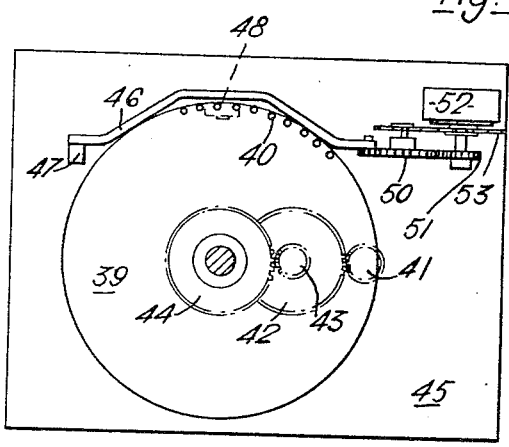
Inventor
Timothy John Archer Davis
By
Browne Schuyler and Beveridge
Attorney

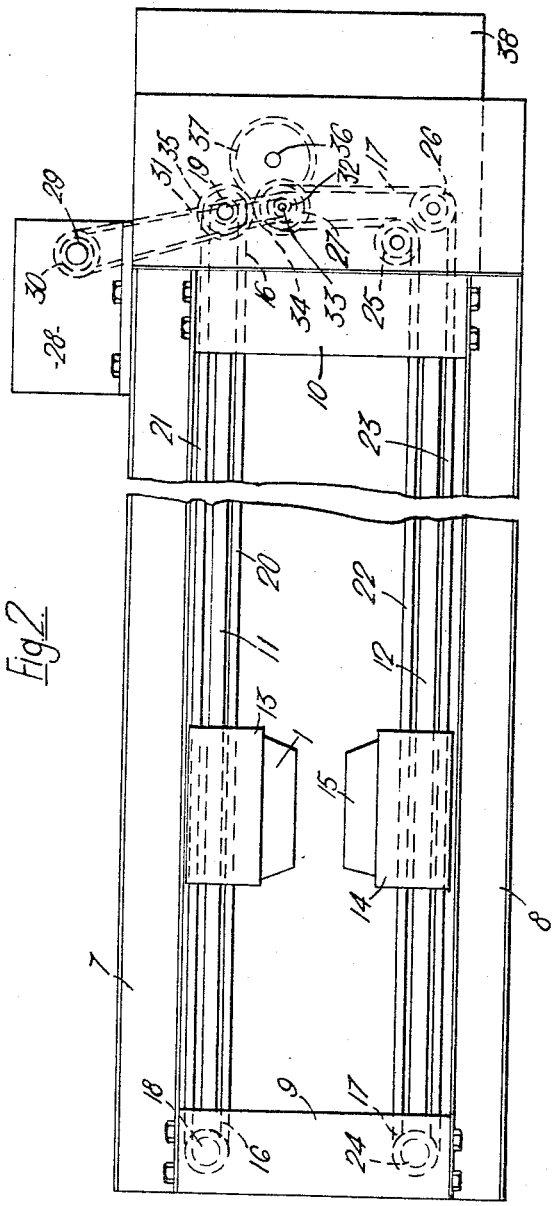

United States Patent Office 3,306,103
Patented Feb. 28, 1967

3,306,103
ERROR COMPENSATION FOR MEASURING GAUGES
Timothy J. A. Davis, Southend-on-Sea, Essex, England, assignor to E. K. Cole, Limited, Southend-on-Sea, England
Filed July 7, 1964, Ser. No. 380,766
Claims priority, application Great Britain, July 11, 1963, 27,476/63
4 Claims. (Cl. 73—159)

This invention relates to gauges for measuring a characteristic, for example thickness or moisture content of a web or strip of material where the gauges are caused to traverse the material.

In one type of radiation thickness gauge, a radiation source is mounted on one side of the material and an ionisation chamber is mounted in a corresponding position on the other side of the material. When it is required that the gauge shall traverse the material, the radiation source and the ionisation chamber may each be mounted on a rod or a suitably tensioned wire which extends across the material. Due to the mechanical imperfections of these traverse mechanisms, a constant positional relationship is not always maintained between the source and the chamber and, as a result, the measurements obtained are sometimes inaccurate. The mechanical imperfections can be considerably reduced by suitable adjustment of the traverse mechanism, but this is often tedious.

The present invention is a gauge of the said type in which the gauge is adapted to traverse the material under test and wherein means, synchronised with the traverse mechanism, are used for automatically varying the value of an impedance in the circuit of the gauge in accordance with a predetermined programme to correct or reduce in the output of the gauge the effect of any mechanical imperfections in the traverse mechanism.

In a prefererd form of the invention, the said means comprises a first member (e.g. a disc) whose angular position is dependent on the position of the gauge along the traverse mechanism, the member having a number of adjustable projections from one side thereof, the ends of which projections are adapted to be engaged by a second member mechanically coupled to the impedance so that by adjustment of the lengths of the projections from said first member, the value of the impedance may be suitably varied when the gauge is caused to traverse the said material. The second member may be mounted on an arm pivoted at one end, the other end of the arm being coupled through gearing to the said impedance. The projections may be screws mounted in tapped holes in the first member.

The invention will be more readily understood by a perusal of the following description having reference to the accompanying drawings in which FIGURE 1 is a circuit diagram, partly in block schematic, of a measuring gauge according to the invention, FIGURE 2 is a side elevation of a traversing mechanism for the measuring gauge, FIGURE 3 is an end elevation, partly in section, showing in detail a part of FIGURE 2 which comprises a mechanical arrangement for varying the setting of a potentiometer shown in FIGURE 1 and FIGURE 4 is a sectional plan view on the line X—X of FIGURE 3.

In the circuit of FIGURE 1, a measuring gauge comprises an ionisation chamber 1 whose output is amplified in 2 and fed to an indicating device which is represented by a meter 3. Variable resistors 4 and 5 are the usual weight and decay controls respectively. When the circuit is used to measure a characteristic of a material, the chamber 1 is positioned on one side of the material and a radiation source is positioned on the opposite side of the material or, if the gauge is of the backscatter type, the radiation source and the chamber 1 may be mounted, preferably as a single unit, on the same side of the material. To compensate for mechanical imperfections in any traverse mechanisms which may be used to move the chamber 1 and radiation source across the material, a variable resistor 6 is provided. This variable resistor is arranged to suitably vary the voltage across 5 so that the voltage between the slider of 5 and earth varies in dependence upon the variation of chamber current and a correct indication of the thickness or weight of the material is obtained. The method by which the value of this variable resistor is controlled will now be described with reference to FIGURES 2, 3 and 4.

The traversing mechanism of FIGURE 2 comprises a frame having two horizontal beams 7 and 8 separated by vertical members 9 and 10. Positioned within the frame are two rods 11 and 12. A housing 13 for the ionisation chamber 1 is mounted on the rod 11 while a housing 14 for a radiation source 15 is mounted on the rod 12. The housings 13 and 14 are adapted to be moved along their respective rods by chains 16 and 17 whose ends are mechanically coupled to the appropriate housings. The chain 16 passes round sprocket wheels 18 and 19, and through tubes 20 and 21 while the chain 17 passes through tubes 22 and 23, and round sprocket wheels 24 . . . 27. The drive for the chains 16 and 17 is provided from a motor 28 having an output shaft 29 on which is mounted a sprocket wheel 30. A chain 31 passes round the sprocket wheel 30 and round a sprocket wheel 32 on a shaft 33 to provide the drive for the chain 17. The chain 16 is driven through a unity gearing provided by a gear wheel 34 on the shaft 33 and a gear wheel 35. The motor also provides a drive for a unit 38, shown in detail in FIGURES 3 and 4, through a reduction gearing comprising a gear wheel 37 on a shaft 36 and a gear wheel (not shown) on the shaft 33.

In FIGURES 3 and 4, a disc 39 carrying a number of screws 40 in tapped holes round its periphery is arranged to be driven through gear wheels 41 to 44 from the shaft 36 so that the angular position of the disc 39 bears a constant relationship to the position of the gauge on the traverse mechanism of FIGURE 2. The gear wheels and the disc 39 are mounted on a plate 45. An arm 46, pivoted at 47, carries a disc 48, the edge of which is arranged to run on the heads of the screws 40. The arm may be loaded by a spring (not shown), one end of which is mounted on the arm while the other end is mounted on, for example, a plate 49. The free end of the arm 46 is mechanically coupled through gears 50 and 51 to a variable resistor 52 which is that represented by 6 in FIGURE 1. The variable resistor 52 and the gears 50 and 51 are mounted on a plate 53 which is positioned between the plates 45 and 49. By suitable adjustment of the positions of each of the screws 40 in the disc 39 to correspond with the errors in measurements obtained at corresponding positions of the gauge on the traverse mechanism, the value of the variable resistor 52 may be suitably varied so that a true indication of measurement may be obtained at the meter 3 (FIGURE 1). It will be appreciated that the greater the number of screws 40, the greater will be the accuracy of the measuring gauge. In practice it has been found to be adequate to have a screw for each 6 to 8 inches along the traverse mechanism. The desired positions for the screws 40 in the disc 39 may be readily set up by causing the measuring gauge to pass along the traverse mechanism, the screws being adjusted in dependence on the variation in the amplitude of the output signal from the chamber 1.

Although the invention has been described with reference to radiation thickness measuring gauges it will be appreciated that it is equally applicable to, for example, moisture gauges, where one plate of a capacitor is mounted on one side of the material while the other plate is mounted in a similar position on the other side thereof.

I claim:
1. Apparatus for measuring the characteristic of a material in sheet form, which apparatus comprises a transducer, traverse mechanism for effecting the traverse of said transducer across the material, an output circuit for the transducer, a variable impedance for controlling the signal level in the circuit, a device having preadjustable means, a mechanical coupling between the preadjustable means and said impedance to vary the value thereof, means for setting said preadjustable means in accordance with mechanical imperfections in said traverse mechanism such as would affect the spatial relationship bteween the transducer and the material to introduce inaccuracies in the measurement, means for driving the device in synchronism with said mechanism to effect said variation and means for using said variation to correct or reduce in said output circuit the effect of said mechanical imperfections.

2. Apparatus for measuring the characteristic of a material in sheet form, which apparatus comprises a transducer, traverse mechanism for effecting the traverse of said transducer across the material, an output circuit for the transducer, a variable impedance for controlling the signal level in the circuit, a first member having on one side thereof a plurality of preadjustable projections, a second member adapted to engage the projections and mechanically coupled to said impedance to vary the value thereof, means for driving said first member in synchronism with said mechanism to effect said variation, means for setting the lengths of said projections in accordance with mechanical imperfections at corresponding positions in said traverse mechanism such as would affect the spatial relationship between the transducer and the material to introduce inaccuracies in the measurement and means for using said variation to correct or reduce in said output circuit the effect of said mechanical imperfections.

3. An apparatus according to claim 2, comprising an arm providing a mounting for said second member, a pivot at one end of the arm and a mechanical coupling between the other end of the arm and said variable impedance.

4. An apparatus according to claim 2, in which said first member is in the form of a disc whose angular position is dependent on the position of said transducer in said traverse mechanism.

References Cited by the Examiner

UNITED STATES PATENTS

| 3,084,314 | 4/1963 | Ziffer | 250—83 X |
| 3,190,261 | 6/1965 | Ziffer | 73—159 |

FOREIGN PATENTS 817,371 7/1959 Great Britain.

DAVID SCHONBERG, *Primary Examiner.*

LOUIS R. PRINCE, *Examiner.*

M. B. HEPPS, *Assistant Examiner.*